(12) United States Patent
Fukasawa (10) Patent No.: US 7,117,531 B2
(45) Date of Patent: Oct. 3, 2006

(54) COMPUTER MONITORING SYSTEM

(75) Inventor: Mikio Fukasawa, Obihiro (JP)

(73) Assignee: System Support, Inc., Obihiro (JP)

( * ) Notice: Subject to any disclaimer, the term of this patent is extended or adjusted under 35 U.S.C. 154(b) by 829 days.

(21) Appl. No.: 09/922,945

(22) Filed: Aug. 7, 2001

(65) Prior Publication Data

US 2002/0026589 A1 Feb. 28, 2002

(30) Foreign Application Priority Data

| Aug. 8, 2000 | (JP) | ............................ P2000-239356 |
| Mar. 29, 2001 | (JP) | ............................ P2001-097057 |
| Jun. 29, 2001 | (JP) | ............................ P2001-198427 |

(51) Int. Cl.
*G06F 11/30* (2006.01)
*G06F 15/173* (2006.01)
*G06Q 99/00* (2006.01)

(52) U.S. Cl. ............................ 726/22; 709/224; 705/51

(58) Field of Classification Search ................ 713/200; 714/38; 717/127; 709/224; 718/102–103; 705/51–52; 726/26–27, 22–23, 25
See application file for complete search history.

(56) References Cited

U.S. PATENT DOCUMENTS

| 5,388,268 | A | * | 2/1995 | Beach et al. ................ 717/127 |
| 5,590,056 | A | * | 12/1996 | Barritz ...................... 702/186 |
| 5,964,839 | A | * | 10/1999 | Johnson et al. ............. 709/224 |
| 5,987,611 | A | * | 11/1999 | Freund ...................... 713/201 |
| 6,049,789 | A | * | 4/2000 | Frison et al. ................. 705/59 |
| 6,381,635 | B1 | * | 4/2002 | Hoyer et al. ................ 709/207 |
| 6,583,794 | B1 | * | 6/2003 | Wattenberg ................. 715/708 |
| 6,651,098 | B1 | * | 11/2003 | Carroll et al. .............. 709/224 |
| 6,658,568 | B1 | * | 12/2003 | Ginter et al. ............... 713/193 |
| 6,662,225 | B1 | * | 12/2003 | Motoyama et al. ......... 709/224 |
| 6,799,209 | B1 | * | 9/2004 | Hayton ...................... 709/223 |

FOREIGN PATENT DOCUMENTS

| JP | 59-094131 | 5/1984 |
| JP | 09-274596 | 10/1987 |
| JP | 64-084347 | 3/1989 |
| JP | 04-086939 | 3/1992 |
| JP | 05-274190 | 10/1993 |
| JP | 06-059942 | 3/1994 |
| JP | 08-263283 | 10/1996 |

(Continued)

OTHER PUBLICATIONS

Wakabayashi, Addition and deletion of application: Part 6 Thorough conquer of uninstall . . . , vol. 1, Oct. 7, 1999, pp. 52-57.

(Continued)

*Primary Examiner*—Emmanuel L. Moise
*Assistant Examiner*—Minh Dieu Nguyen
(74) *Attorney, Agent, or Firm*—Jacobson Holman PLLC (57) ABSTRACT

The invention provides a computer monitoring system for performing monitoring to improve a use efficiency of a monitor-subject computer and also for detecting illegal mail transmission/reception, illegal browsing, etc., which cannot be detected by a prior art, thus promoting proper use of the computers in the network.

In this computer monitoring system, a monitor-subject PC2 records a log of a use state of application software products, which log is acquired from the monitor-subject PC2 by a monitor PC1, which in turn calculates a using time and a use rate of each of the application software products except an idle state time and also a time and a use rate of the idle state, thus outputting and displaying the use rate.

16 Claims, 8 Drawing Sheets

FOREIGN PATENT DOCUMENTS

| | | |
|---|---|---|
| JP | 09-091179 | 4/1997 |
| JP | 09-282275 | 10/1997 |
| JP | 10-510647 | 10/1998 |
| JP | 10-326245 | 12/1998 |
| JP | 2000-207254 | 7/2000 |
| WO | WO00/07099 | 2/2000 |

OTHER PUBLICATIONS

Test Drive: eTrust Intrusion Detection (Session Wall-3), Windows 2000 World, Jul. 1, 2000, vol. 5, No. 7, pp. 260-261.

Maser KDE! Customization Part 2: Easy System Management from KDE Satoshi Kinebuchi et al, Apr. 1, 2000, vol. 9, No. 4, pp. 33-39.

Kawamata et al, May 10, 1999, Nikkei Computer, No. 469, pp. 87-91, Restriction On Internet Use That Has Started By Companies . . .

Akaike et al, IPSJ JOURNAL, Vo. 33, No. 5, May 15, 1992, pp. 736-745, Analysis System of User Action on X-Window.

ASCII DOS/V ISSUE, vol. 6, No. 2, Feb. 1, 2000, pp. 112-117, Special Issue: Complete Analysis of Windoes 2000 Differences . . .

* cited by examiner

| Event type | Date and time | Parameter |
|---|---|---|
| Session start | 2000/07/21 09:47:36 | |
| Active | 2000/07/21 09:51:17 | SOFTWARE A |
| Active | 2000/07/21 09:59:35 | SOFTWARE B |
| Active | 2000/07/21 09:57:25 | SOFTWARE C |
| Character input | 2000/07/21 10:00:01 | Contact:101200000, ZIP code:〒092-02 |
| Active | 2000/07/21 10:05:45 | SOFTWARE A |
| ... | ... | ... |

July, 2000

| SUN | MON | TUE | WED | THU | FRI | SAT |
|---|---|---|---|---|---|---|
| | | | | | | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | | | | | |

FIG.3

| Application | Using time | Use rate |
|---|---|---|
| ☐ SOFTWARE D | 00:00:30 | 0.1% |
| ☐ SOFTWARE E | 00:00:23 | 0.0% |
| ☐ SOFTWARE F | 00:00:08 | 0.0% |
| ☐ SOFTWARE G | 00:41:53 | 5.0% |
| ☐ SOFTWARE H | 00:08:49 | 1.1% |
| ☒ IDLE | 06:31:04 | 47.0% |
| ⋮ | ⋮ | ⋮ |

COMPUTER MONITORING SYSTEM

BACKGROUND OF THE INVENTION

1. Field of the Invention

The invention relates to a computer monitoring system for monitoring a computer and, more particularly to, a computer monitoring system which can monitor also a computer for its use efficiency and an illegal activity in e-mail transmission/reception, internet browsing, or software installation at it.

2. Description of the Related Art

There has also been available such a system that is provided with a function of monitoring a computer connected to a network.

Such a system is disclosed in, for example, Japan Patent Application Laid-Open No. Hei 8-263283 "SOFTWARE MANAGER SYSTEM" (Applicant: Ricoh, Inventor: Hideki Kobayashi) publicized on Oct. 11'th, 1996.

This invention provides a software manager system which can easily maintain and manage software programs so that they may not be used illegally at a plurality of terminals connected to a communication means such as LAN.

Such a prior art system, however, can only monitor a log of a monitor-subject computer and cannot actively decide a use efficiency and an illegal use of a monitor-subject computer, thus suffering from a problem that the monitoring functions cannot fully be utilized.

SUMMARY OF THE INVENTION

In view of the above, it is an object of the invention to provide a computer monitoring system which can monitor a monitor-subject computer to improve its use efficiency and also find illegal mail transmission/reception, browsing, etc. so far impossible to decide, thus promoting its appropriate use.

To solve the problem of the above-mentioned prior art system, in a computer monitoring system according to the invention, a monitor-subject computer records a log of a use state of application software, which log is acquired from the monitor-subject computer by a monitor computer, which in turn calculates an application software-specific using time and a use rate except an idle state time as well as an idle state time and a use rate to thereby output a use efficiency, thus enabling measuring the use efficiency specific to the application software at that monitor-subject computer.

In the above-mentioned computer monitoring system according to the invention, the monitor computer can monitor a plurality of monitor-subject computers in duty posts to thereby acquire a log at these monitor-subject computers for each of the posts and then output an application software use efficiency specific to that post, thus measuring the application software use efficiency for each of the posts.

In the above-mentioned computer monitoring system according to the invention, the monitor computer can acquire a log of characters input at a monitor-subject computer to thereby analyze whether the monitor-subject computer has created an illegal document, thus inhibiting illegal document creation to promote appropriate use at the monitor-subject computer.

In the above-mentioned computer monitoring system according to the invention, the monitor computer can acquire a log of the contents of a mail transmitted/received at a monitor-subject computer to thereby analyze whether the monitor-subject computer has transmitted or received a mail illegally, thus inhibiting illegal mail transmission/reception to promote appropriate use at the monitor-subject computer.

In the above-mentioned computer monitoring system according to the invention, the monitor computer can acquire a log of a browsing operation of the internet by a monitor-subject computer to thereby analyze whether the monitor-subject computer has browsed it illegally, thus inhibiting illegal browsing to promote appropriate use at the monitor-subject computer.

In the above-mentioned monitoring system according to the invention, the monitor computer can acquire a log of installation or un-installation operations of software, thus inhibiting illegal installation or un-installation of software to promote appropriate use at the monitor-subject computer.

In the above-mentioned computer monitoring system according to the invention, the monitor computer can acquire a log of characters input at a monitor-subject computer and also calculate the number of these input characters to thereby calculate an input efficiency for a software using time at the monitor-subject computer, thus assessing the input efficiency of the user of the monitor-subject computer.

In the computer monitoring system according to the invention, a monitor-subject computer holds a log of home page accesses, which log is acquired from the monitor-subject computer by the monitor computer, which then sums up times for accessing each home page for a specific summation duration and displays a list of the URLs or names of the home pages in a descending order of the access times, thus enabling knowing popular sites easily.

In the computer monitoring system according to the invention, a monitor-subject computer holds a log of a use state of application software, which log is acquired from the monitor-subject computer by the monitor computer, which then calculates availability based on a ratio between an idle state time and an application software using time and displays a list of the monitor-subject computers in an order of the availability value, thus enabling easily knowing which one of the monitor-subject computers is high or low in availability.

In the computer monitoring system according to the invention, a monitor-subject computer holds a log of site viewing operations, which log is acquired from the monitor-subject computer by the monitor computer, which then sums up the numbers of viewing times or the viewing times for each of sites registered beforehand if that log relates to the site, to calculate a viewing rate based on thus calculated sum of the number of viewing times or the viewing times and display a list of the names of the monitor-subject computers in an order of the viewing rate, thus enabling easily knowing a viewing rate of the monitor-subject computers at a specific site.

In the computer monitoring system according to the invention, a monitor-subject computer holds a log of a use state of application software, which log is acquired from the monitor-subject computer by the monitor computer, which then sums up the numbers of using times or the using times for each application software product if that log relates to the application software product, to calculate a use rate based on thus calculated sum of the number of using times or the using times and display a list of the names of the monitor-subject computers in an ascending order of the use rate, thus enabling easily knowing the use rate of the monitor-subject computer for specific application software.

In the computer monitoring system according to the invention, a monitor-subject computer holds a log of a use state of application software or accesses to a home page, while the monitor computer classifies the application software products used or the home pages accessed into specific items beforehand, so that the monitor computer, when having acquired the log from the monitor-subject computer, calculates a using time and a viewing time for each classification and displays a list of the names of the monitor-subject computers based on a ratio of the specific items, thus enabling easily knowing the monitor-subject computer in an order of the ratio of the specific items.

In the computer monitoring system according to the invention, a monitor-subject computer holds a log of characters input in use of application software, which log is acquired from the monitor-subject computer by the monitor computer, which then displays the input characters for each application software product, thus enabling easily knowing the input characters for each application software product.

In the computer monitoring system according to the invention, a monitor-subject computer holds a log of a use state of application software, while the monitor computer registers the application software products by classifying them into categories beforehand, so that the monitor computer, when having acquired the log from the monitor-subject computer, sums up the using times both for each and for all of the categories and calculates the use rates for each of all the categories and then displays thus calculated use rates, thus enabling easily knowing the use rate for each category to which the application belongs as against all the categories.

In the computer monitoring system according to the invention, a monitor-subject computer holds a log of a state viewing a site, while the monitor computer registers the sites by classifying them into categories beforehand, so that the monitor computer, when having acquired the log from the monitor-subject computer, sums up the viewing times both for each and for all of the categories and calculates the viewing rate for a specific one of all the categories and then displays thus calculated viewing rate, thus enabling easily knowing the viewing rate for each category to which the site belongs as against all the categories.

DESCRIPTION OF THE PREFERRED EMBODIMENTS

The following will describe embodiments of the invention with reference to the drawings.

In a computer monitoring system related to this embodiment of the invention, a monitor computer (monitor PC) can acquire a log of actions of a monitor-subject computer (monitor-subject PC) and also calculate its use efficiency based on that log to then output and display it, particularly calculate an active time excluding an idle state time of a working application at the monitor-subject PC to measure a use efficiency of the application software at the monitor-subject PC, thus improving the use efficiency.

Furthermore, the computer monitoring system related to this embodiment of the invention monitors illegal e-mail transmission/reception or illegal browsing over the Internet, thus promoting appropriate use of the computers over the network.

Figure 1:
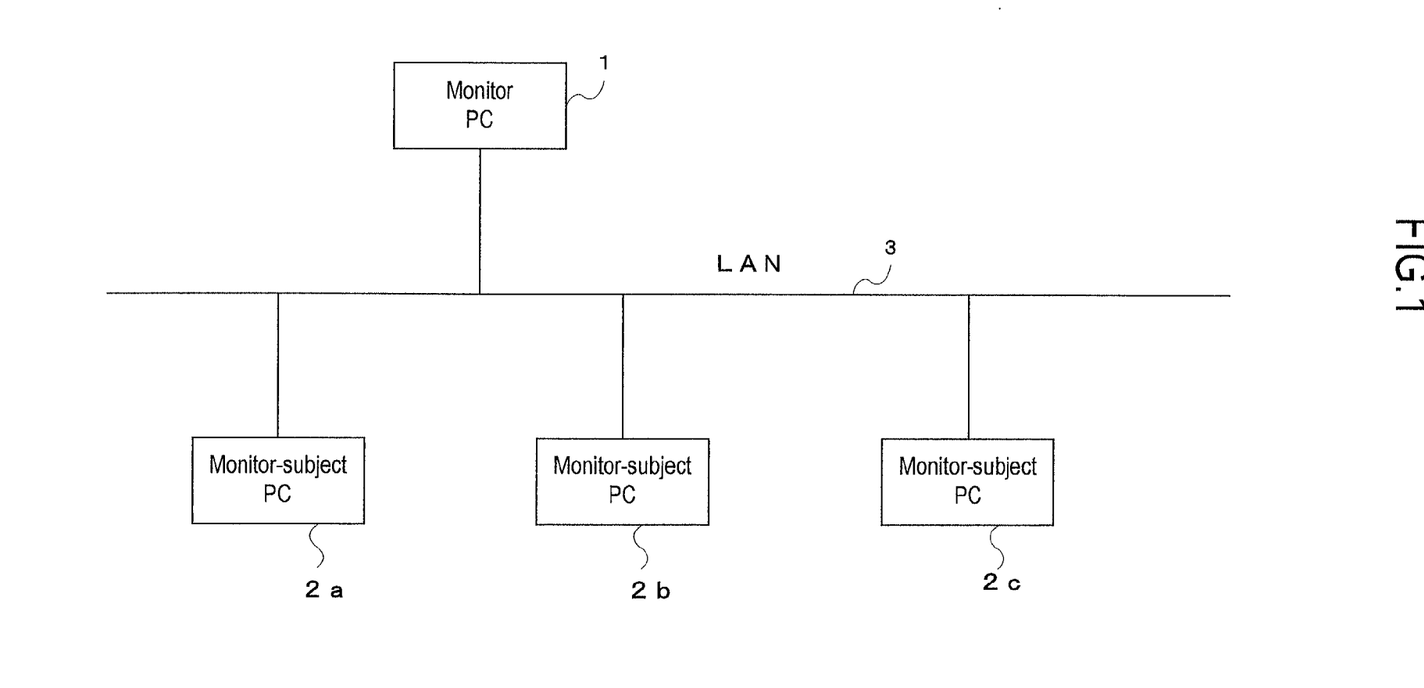
FIG. 1 is a block diagram for showing a configuration of a computer monitoring system related to an embodiment of the invention.

The computer monitoring system (the present system) related to this embodiment of the invention is described with reference to FIG. 1 as follows. FIG. 1 is a block diagram for showing a configuration of the computer monitoring system related to this embodiment of the invention.

The present system, in which a plurality of computers is interconnected in a one-to-many, one-to-one, or many-to-one LAN configuration, comprises a monitor computer (monitor PC) 1 for monitoring, monitor-subject computers (monitor-subject PCs) 2a, 2b, and 2c to be monitored by the monitor PC1, and a LAN3 for interconnecting the monitor PC1 and these monitor-subject PCs2 as shown in FIG. 1.

In this figure, the LAN3 is shown as of wired connection but may be of wireless connection.

Furthermore, generally, the monitor PC1 may be considered to be utilized by a boss at a company or a teacher at a school, while the monitor-subject PCs2 may be considered to be utilized by his subordinates at the company of pupils at a school.

The following will specifically describe those components in the present system.

The monitor PC1 is used to monitor the monitor-subject PCs2 connected to the LAN. This PC1 has managing software installed therein for monitoring for acquiring a new log of input characters etc. in addition to a usual log (record of actions and times) at the monitor-subject PCs2 to thereby display their data in order to calculate and display the use efficiency of the monitor-subject PCs2 based on these usual logs and also detect illegal e-mail transmission/reception or illegal browsing based on that log of the characters etc.

In this embodiment, as shown in FIG. 1, the monitor PC1 monitors each of the plurality of monitor-subject PCs 2a, 2b, and 2c and also collectively monitors a plurality of monitor-subject PCs2 in a specific group (duty post) to analyze a use state of applications for each specific group.

How the monitor PC1 monitors the PCs specifically is described later.

The monitor-subject PCs2 are connected to the LAN3 and have each installed therein monitor software monitored by the monitor PC1, to give such logs as follows using, for example, TELNET.

The logs record applications' active and idle states, mail transmission/reception (mail contents acquired in texts), input characters (character data acquired in texts), software installation/un-installation, browsing over the Internet/intranet, etc. Naturally, those logs have date and time acquired therein automatically.

The LAN3, to which the monitor PC1 and the monitor-subject PCs2a–2c are connected, may come in of wired connection, wireless connection, or hybrid connection utilizing both connection types.

Furthermore, the monitor PC1 has the manager software installed therein and so has a right to monitor the monitor-subject PC2 in which the monitor software is installed but the monitor-subject PC2*a* has not right to monitor another monitor-subject PC2*b*.

Figure 4:
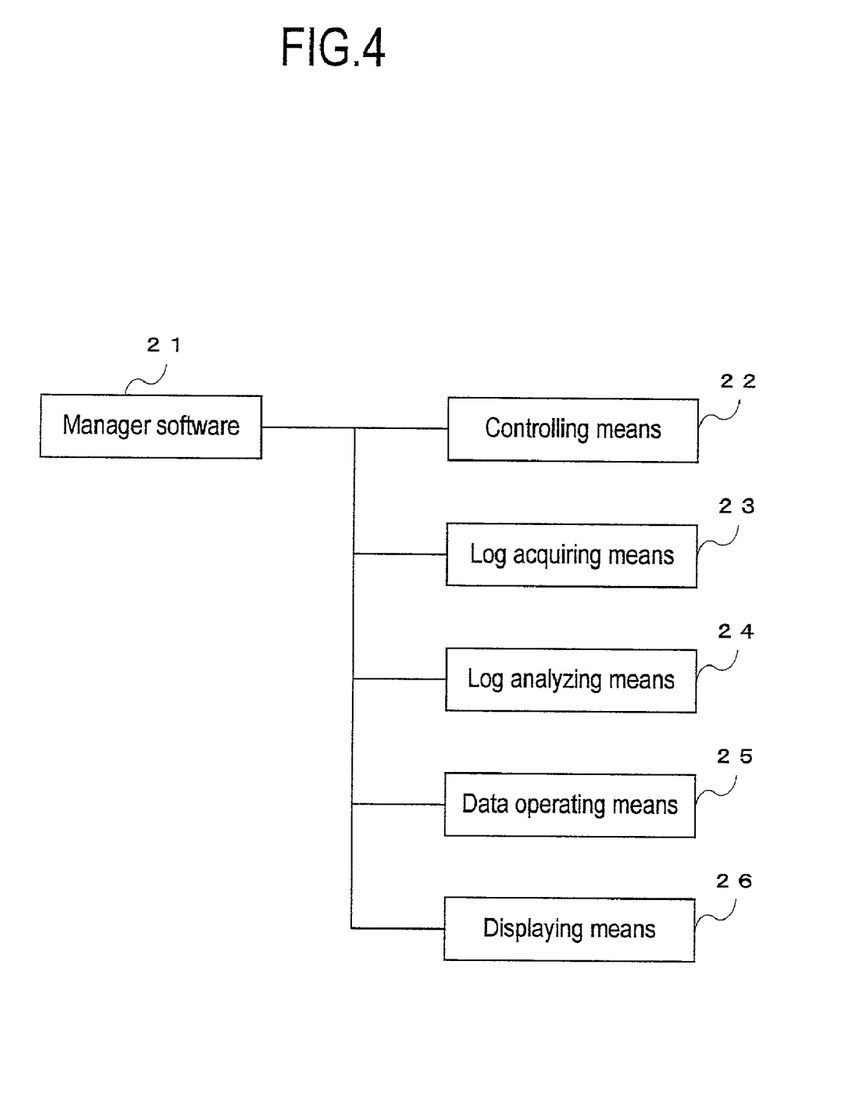
FIG. 4 is a configuration diagram for showing manager software used at the monitor PC1.
Figure 5:
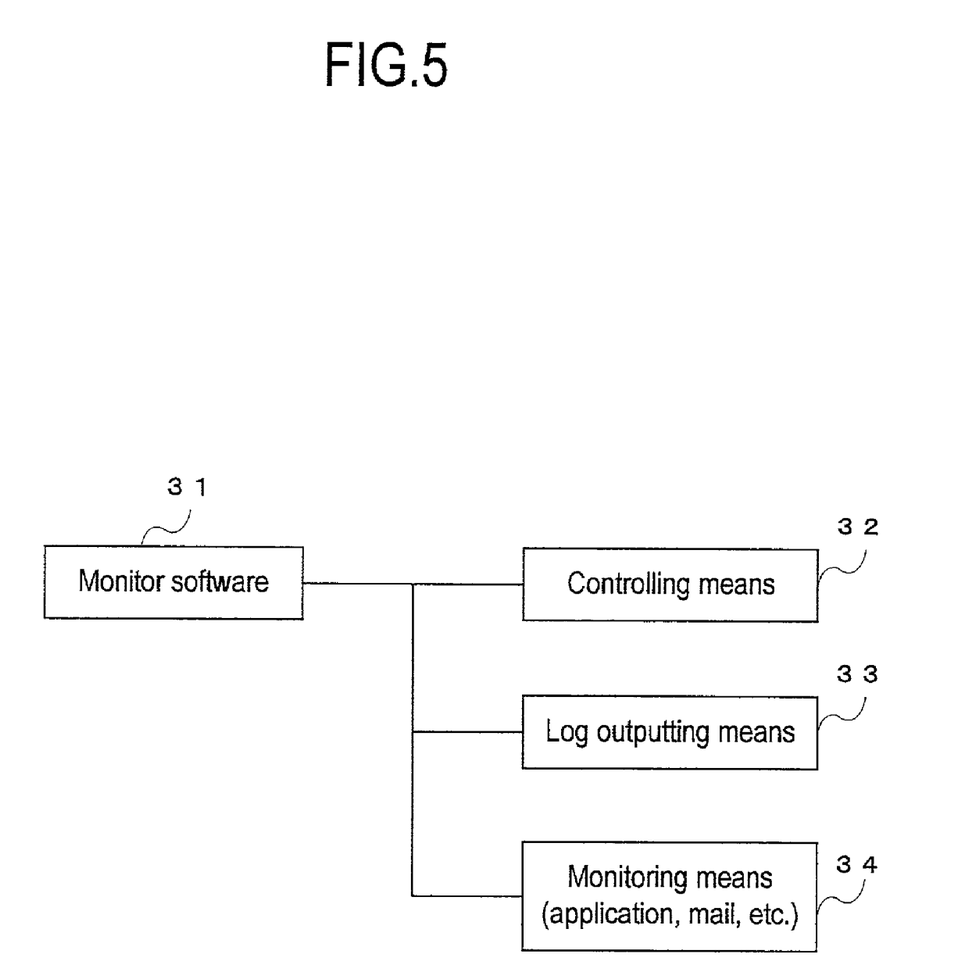
FIG. 5 is a configuration diagram for showing monitor software used at the monitor-subject PC2.

The following will describe the manager software and the monitor software used in the present system with reference with FIGS. 4 and 5. FIG. 4 shows a configuration diagram of the manager software and FIG. 5, a configuration diagram of the monitor software.

As shown in FIG. 4, the manager software 21 comprises a controlling means 22, a log acquiring means 23, a log analyzing means 24, a data operating means 25, and a displaying means 26.

As shown in FIG. 5, the monitor software 31, on the other hand, comprises a controlling means 32, a log outputting means 33, and a plurality of monitoring means 34.

The following will specifically describe the configuration of these means of the manager software.

The controlling means 22 is used to control each operation by the manager software 21. The controlling means 22, for example, outputs a log acquire instruction to the monitor-subject PC2 via the LAN3 and also outputs a data operate instruction relating to a log to the data operating means 25. Further, the controlling means 22 outputs to the displaying means 26 a display instruction for displaying a log acquired at the data acquiring means 23 or a data operation result calculated at the data operating means 25.

In this case, the log acquire instruction may be output when a log acquire directive is input from a user of the monitor PC1 or automatically at a constant time.

The log acquiring means 23, in response to a log acquiring instruction from the controlling means 22, acquires a log output by the monitor-subject PC2 and stores it in a memory portion (not shown) of the monitor PC1.

The log analyzing means 24 analyzes the log stored in the memory portion, decides and classifies its type and then stores it in another area in the memory portion.

The data operating means 25 uses the type-specific log classified and stored by the log analyzing means 24 to thereby calculate desired data based on a data operating instruction output by the controlling means 22 and store thus calculated data in another area in the memory portion.

The displaying means 26 displays the type-specific log classified and stored by the log analyzing means 24 or the data operating result calculated by the data operating means 25 according to a displaying instruction from the controlling means 22.

The following will specifically describe a configuration of each of those means of the monitoring software 31.

The controlling means 32 is used to control each operation at the monitor software 31. The controlling means 32 detects a log acquiring instruction output by the manager software 21 to then output a log outputting instruction to the log outputting means 33.

The log outputting means 33 summarizes various types of logs stored by each of the monitoring means 34 and transmits it to the monitor PC1 based on the log acquiring instruction from the controlling means 32. Moreover, the log outputting means 33 deletes thus output logs from a memory portion (not shown) of the monitor-subject PC2.

The plurality of monitoring means 34 is provided for each of monitor-subject applications such as applications and mails to thereby always monitor the corresponding monitor-subject application and store the monitoring result as a log in the memory portion of the monitor-subject PC2.

Figure 2:
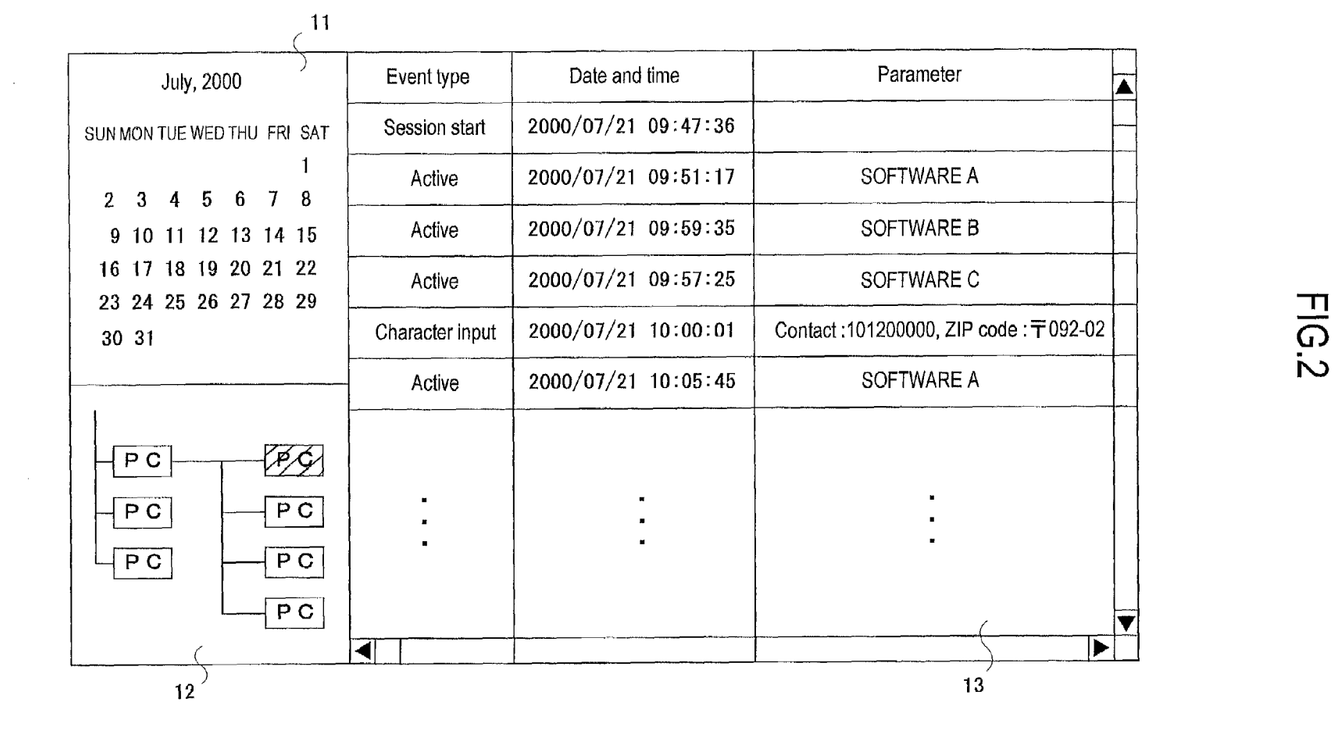
FIG. 2 is a schematic diagram for showing a screen at a monitor PC1 in which a log of a monitor-subject PC2 is shown.
Figure 3:
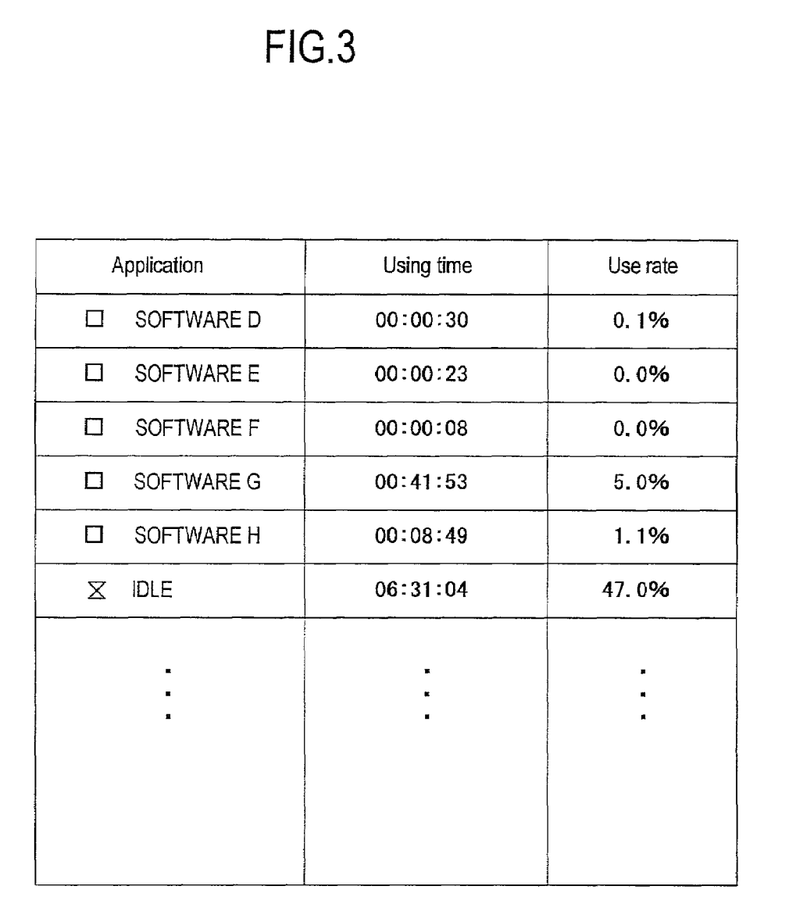
FIG. 3 is a schematic diagram for showing a display example of a use efficiency at the monitor-subject PC2.
Figure 6:
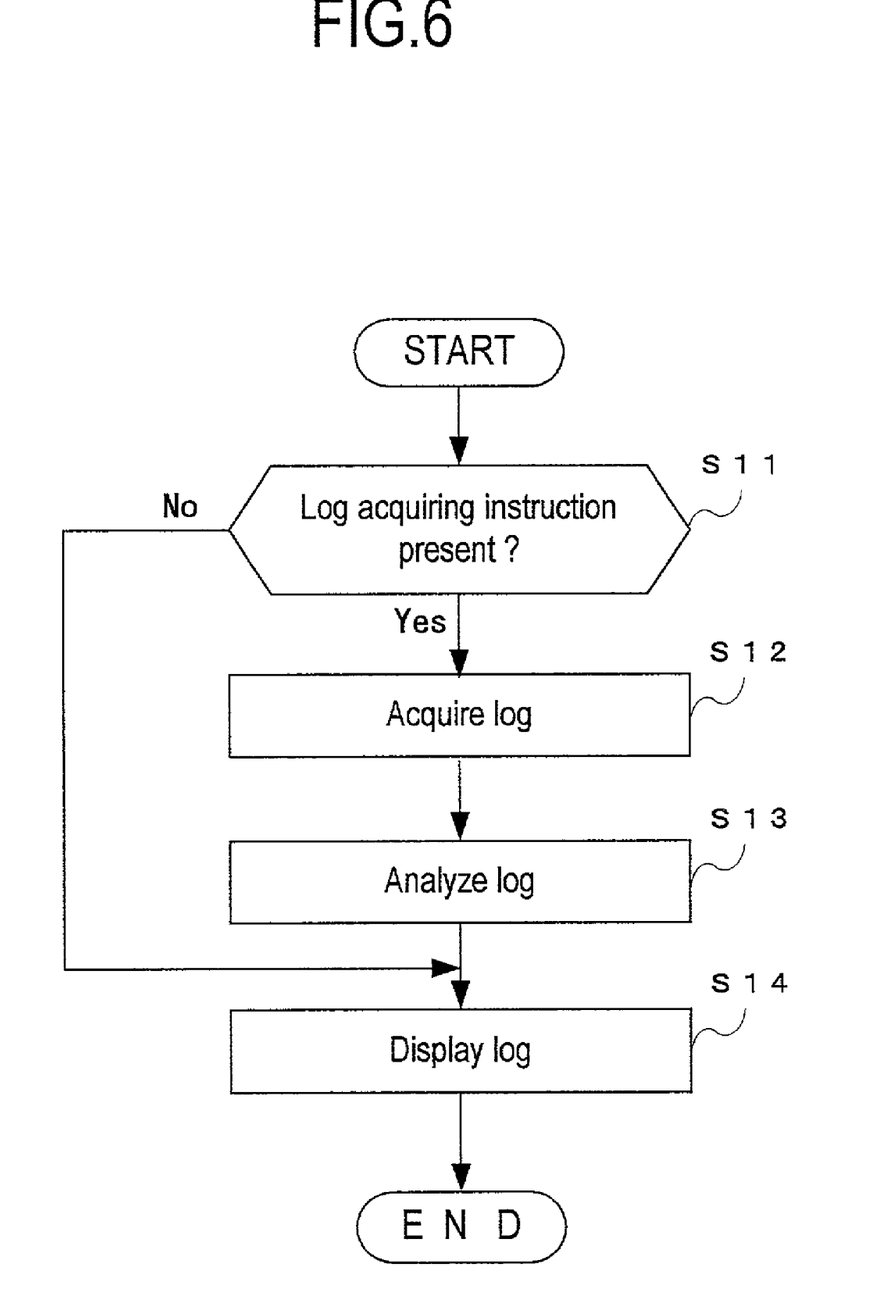
FIG. 6 is a flowchart for showing log acquisition in the manager software.
Figure 7:
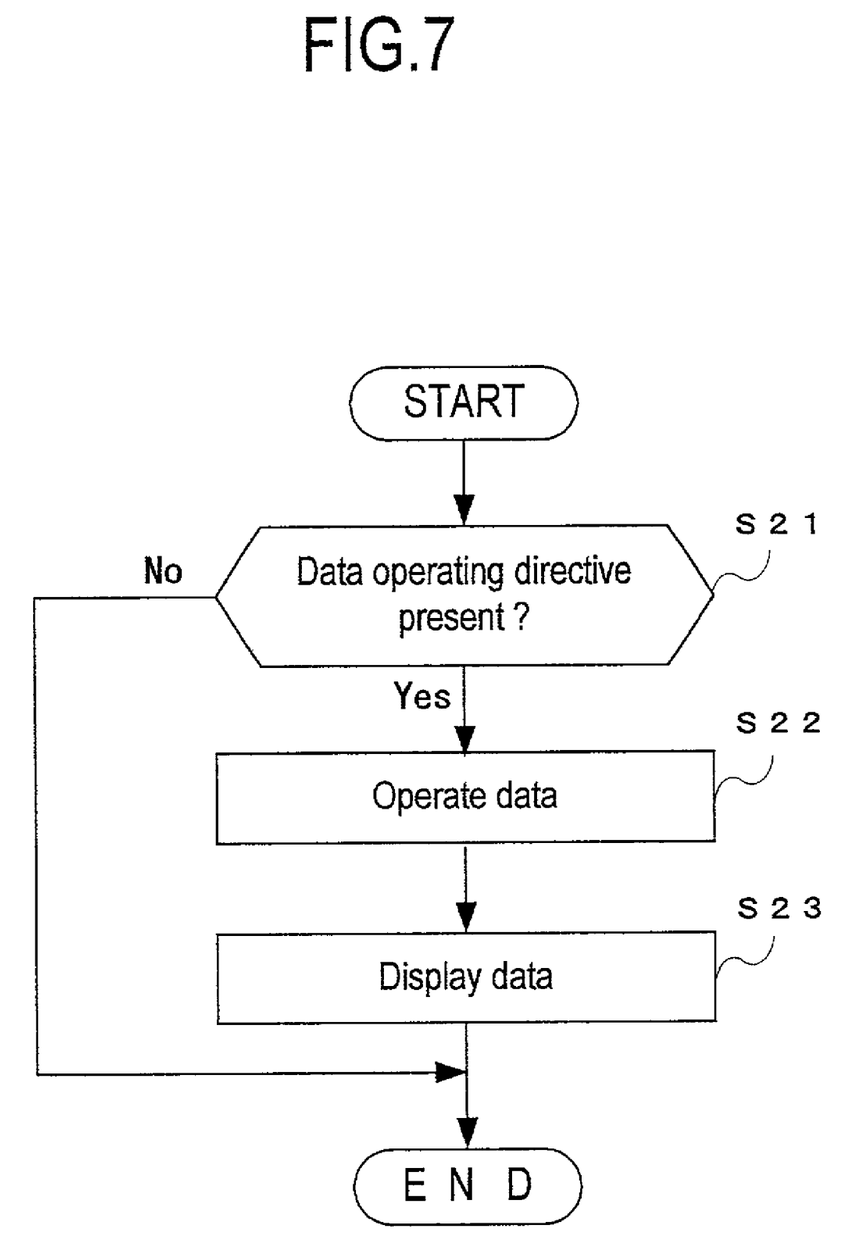
FIG. 7 is a flowchart for showing data operation in the manager software.
Figure 8:
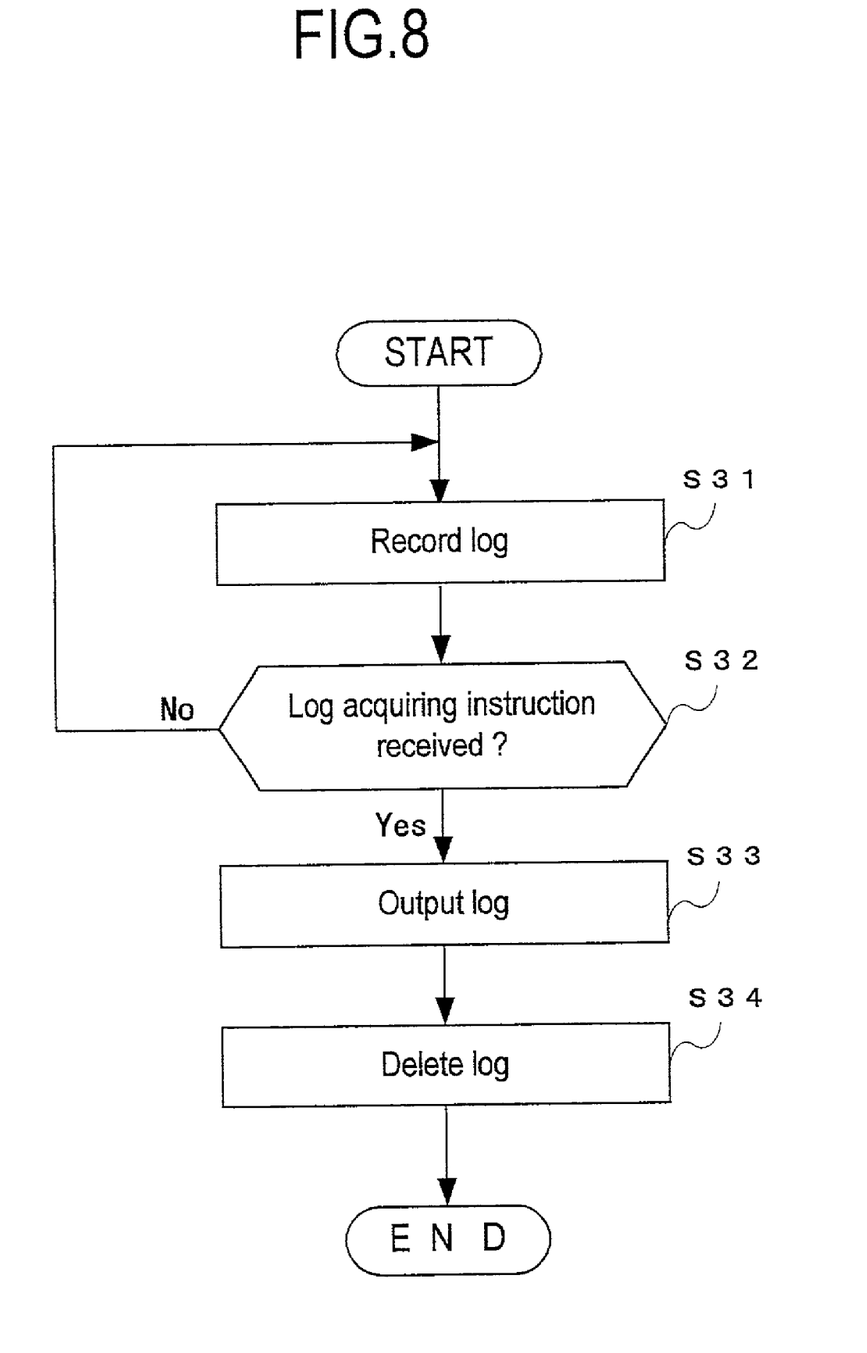
FIG. 8 is a flowchart for showing log outputting in the monitor software.

The following will describe monitoring processing at the present system with reference to FIGS. 2–8. FIG. 2 is a schematic diagram for showing a log displaying screen of the monitor-subject PC2 at the monitor PC1 and FIG. 3 is a schematic diagram for showing a display example of the use efficiency at the monitor-subject PC2. FIG. 6 is a flowchart for showing log acquisition at the manager software, FIG. 7 is a flowchart for showing a data operation at the manager software, and FIG. 8 is a flowchart for showing log outputting at the manager software.

When the monitor PC1 outputs via the LAN3 to a specific monitor-subject PC2 a directive for acquiring a log, the monitor-subject PC2 transmits the recorded log via the LAN3 to the monitor PC1.

Specifically, first at the monitor PC1, the controlling means 32 of the manager software 21 outputs and transmits a log acquiring instruction to a specific monitor-subject PC1 via the LAN3.

At the monitor-subject PC2, the monitoring means 34 provided for each monitor-subject application is always recording logs (see S31 of FIG. 8).

When the log acquiring instruction is received by the monitor-subject PC2 ("YES" at S32 of FIG. 8), the controlling means 32 detects the log acquiring instruction to thereby output a log outputting instruction to the log outputting means 33). If the log acquiring instruction is not received ("NO" at S32 of FIG. 8), the monitor-subject PC2 continues to record the logs.

The log outputting means 33, based on the log outputting instruction, reads out logs recorded by each monitoring means 34 and outputs and transmits them collectively via the LAN3 to the monitor PC1 (S33 of FIG. 8). Thus read out logs are deleted from the memory portion by the log outputting means 34 (S34 of FIG. 8).

Next, the monitor PC1 acquires the logs transmitted from the monitor-subject PC2 to then analyze thus acquired logs and classify them for each monitor subject or set item.

Specifically, at the monitor PC1 the log acquiring means 23 of the manager software 21 decides whether a log acquiring instruction has been output from the controlling means 22 (S11 of FIG. 6) and, if it decides so ("YES" at S11 of FIG. 6), acquires the transmitted log (S12 of FIG. 6). Thus acquired log is stored in the memory portion of the monitor PC1.

Next, the log analyzing means 24 analyzes thus acquired logs to classify them for each monitor-subject application or set item and store them in the memory portion (S13 of FIG. 6). Since thus acquired logs are an aggregate of logs recorded by the plurality of monitoring means 34 at the monitor software 31, they can be classified beforehand for each monitor-subject application or set item to thereby be summed up or displayed effectively.

The log analyzing means 24 analyzes each of the acquired logs on which one of the monitor-subject applications each log concerns to thereby specify the log type and store the type-specific logs in the memory portion.

Finally, the logs completely analyzed are displayed by the displaying means 26 (S14 of FIG. 6). The following will describe how to display logs with reference to an example of the display screen.

The monitor PC1 displays an acquired log of the monitor-subject PC2 as shown in the display screen of FIG. 2.

Specifically, the monitor PC1 activates the manager software 21 to then permit the displaying means 25 to display a screen comprised of a calendar portion 11, a connected state displaying portion 12, and a log displaying portion 13.

Just when the manager software has been activated, however, no monitor-subject PC2 is specified, so that no contents are displayed at the log displaying portion 13.

In the state where the monitor-subject logs are completely acquired and classified by the above-mentioned method, when a monitor-subject PC2 is specified by referencing the connected state displaying portion 12 on the display screen of the monitor PC1, the controlling means 22 outputs a displaying instruction to the displaying means 26. The displaying instruction in this case contains information such as log types and orders to be displayed. The displaying means 26, based on the displaying instruction, displays the log contents of that monitor-subject PC2 at the log displaying portion 13.

The displaying means 25 displays classified logs, so that if, for example, no new log is acquired ("NO" at S11 of FIG. 6), it displays acquired and classified logs stored in the memory portion.

The log contents displayed at the log displaying portion 13 include an event type, a date, and a parameter, the event type of which contains "character inputting".

Although not shown in FIG. 2, a mail transmission/reception log, a software installation/un-installation log, and a browsing log are included in the acquired logs.

Therefore, the monitor PC1 can acquire from the monitor-subject PC2 input characters in texts or main transmission/reception contents in texts, so that by analyzing these texts, it can check for illegal document creation or illegal mail transmission/reception.

Furthermore, the monitor PC1 can acquire the monitor-subject PC2 software installation/un-installation from the log, so that it can check for illegal software installation or legal software un-installation.

Moreover, the monitor PC1 can acquire characters input from the monitor-subject PC2 in texts, so that even with application software such as tag software, the character contents can be analyzed because it acquire character texts input.

In addition, the monitor PC1 acquires a browsing log from the monitor-subject PC2, so that it can check on whether a regular home page defined beforehand is being accessed.

In the display screen shown in FIG. 2, when a monitor-subject PC2 is specified by referencing the connected state displaying portion 12 when acquisition and classification of logs from the monitor-subject PC2 is not completed yet, the manager software 21 may perform, in specifications, this log acquisition and classification to display the log on the display screen.

Further, the monitor PC1 calculates the use efficiency of each application software product based on the log contents shown in FIG. 2.

In the display screen shown in FIG. 2, when a directive is input for calculating and displaying a use efficiency, it is displayed as shown in FIG. 3.

Specifically, when the directive for calculation and displaying of the use efficiency is input, the controlling means 22 of the manager software 21 outputs a data operating instruction to the data operating means 25. The data operating means 25 detects the data operating instruction ("YES" at S21 of FIG. 7) to then use classified logs, thus performing operations for obtaining data of the use efficiency (S22 of FIG. 7). Finally, the controlling means 22 outputs a displaying instruction to the displaying means 26, in response to which the displaying means 26 displays the data of the use efficiency on the display screen (S23 of FIG. 7).

In FIG. 3, the using time and the use rate are calculated and displayed for the application contents.

As the using time for each application, a time actually used except an idle state time at the application is calculated.

Specifically, the using time is measured from the time when that application is activated up to the completion of that application which is subtracted by a time (idle state time) from a time point when, for example, five minutes have passed from an action such as the activation or a character inputting up to the next action. That is, the using time refers to an essential application using time.

Note here that in FIG. 3 the idle state is displayed as "IDLE".

Furthermore, the use rate is calculated and displayed in percentage of use in all application products and idle states.

The figure shows the using time and the use rate of the day but may show them as summed up for each week or month. In this case, the monitor PC1 needs to record logs of the summed up times in the memory portion.

Furthermore, it not only can manage utilization of PCs by an individual but also can sum up and display the utilization states of the applications for each department such as the accounting department, the designing department, or the business department.

Specifically, by calculating a using order or an average of applications for each duty post, it is possible to promote improvements in business operations at each department.

For example, if a summing result at the designing department indicates that the use of a table calculating application is larger in amount than the use of a CAD application for designing, it means that a job such as estimating at the designing department is larger in amount than designing, so that it is possible to suggest that the job of this estimating should be shifted to other departments.

Furthermore, the monitor PC1 can acquire the number of input characters from a character inputting log at the monitor-subject PC2 to thereby calculate an inputting efficiency based on the number of input characters during the using time of the application. This enables measuring an inputting efficiency of a user of the monitor-subject PC2 to thereby contribute to better personnel administration.

In addition, if a personal computer is always in a power-ON state over an intranet of a company, an idle state time is prolonged, in which case the application use efficiency is calculated and displayed in a network-connected time with respect to a log-off time.

The above-mentioned efficiencies can be calculated by outputting from the controlling means 22 to the data operating means 25 a data operating instruction for calculating the corresponding efficiency value.

Since the computer monitoring system (the present system) according to this embodiment of the invention permits the monitor PC1 to acquire a log at the monitor-subject PCs2 to thereby calculate and display the use efficiency of each application, it is possible to easily decide whether the application is properly and effectively used at each monitor-subject PC2, thus contributing to promotion of better business operations at these monitor-subject PCs2.

Furthermore, since the present system permits the monitor PC1 to sum up the use states of application software at each duty post from a log at each monitor-subject PC2, it is possible to decide whether the application software is used properly at each department, thus easily improving the business operations.

Moreover, the present system permits the monitor PC1 to acquire the contents of mail transmission/reception at the monitor-subject PC2, it is possible to easily analyze the mail contents, thus contributing to elimination of illegal main transmission/reception.

Additionally, the present system permits the monitor PC1 to know a browsing log and a home page viewing time at the monitor-subject PC2, thus contributing to elimination of illegal browsing over the Internet.

Furthermore, the present system permits the monitor PC1 to acquire a log of software installation/un-installation at the monitor-subject PC2, thus contributing to promotion of proper software installation.

The following will describe first through eighth examples of other utilization methods in the present system.

The first utilization method is displaying of a "list of popular sites". The monitor-subject computers (monitor-subject PCs) are used as an individual computer, a duty spot computer, and an overall computer, using a day, week, month, or year as a unit of summation duration, to display a list of home pages in an access time order.

Specifically, the monitor-subject PCs hold logs relating to home page (site) accesses, while the monitor computer (monitor PC) acquires and classifies the logs relating to the home page accesses at the monitor-subject PCs from each of them and then store these logs in the memory portion.

Then, the manager software 21 at the monitor PC causes the controlling means 22 to output to the data operating means 25 a data operating instruction for accumulating (summing up) access times for each accessed home page in units of the summation duration value so that the data operation may be performed. Moreover, the controlling means 22 outputs to the displaying means 26 a display instruction for displaying a list of the URLs or the names of the home pages in an ascending order of thus accumulated access times so that they may be displayed.

This enables easily knowing popular sites in business operations.

The second utilization method is displaying of a "working-rate order list of PCs (employees)". The monitor-subject PCs are used as a duty spot computer and an overall computer, using a day, week, month, or year as a unit of the summation duration, to display a list of PCs with a low or high use rate based on a ration between an idle state time and a usual business time.

Specifically, the monitor-subject PCs hold logs of use states of business applications, while the monitor PC acquires from each of the monitor-subject PCs the logs of the use states of the business application software at them and classifies them and then stores them in the memory portion.

Then, a data operating instruction is output from the controlling means 22 to the data operating means 25 for accumulating, in the manager software 21 of the monitor PC, idle state times and using times of usual business for each of the monitor-subject PCs to thereby calculate "working rate (use rate)=(usual business using time)/(idle state time)" so that the operation may be performed. Moreover, the controlling means 22 outputs to the displaying means 26 a displaying instruction for displaying a list of the names of the monitor-subject PCs in an order of the working rate so that the list may be displayed.

This enables easily knowing PCs having a high or low working rate.

The third utilization method is displaying of a "list of site (category) specific PCs (employees". The monitor-subject PCs are used as a duty spot computer and an overall computer, using a day, week, month, or year as a unit of the summation duration to display a list of the PCs in an order of the viewing rate of a specific site (category).

Specifically, the monitor PC sets beforehand a site belonging to a specific site or category, to acquire from each of the monitor-subject PCs the log of the sites accessed at them and classify them and then store them in the memory portion.

Then, in the manager software 21 of the monitor PC, the controlling means 22 and the data operating means 25 calculate the number of viewing times and the viewing times for thus set sites and, based on thus calculated values of the number of viewing times and the viewing times, calculate the viewing rate for a specific site using as a denominator the number of viewing times or the viewing time for all of the set sites. Then, the controlling means 22 and the displaying means 26 display a list of the names of the monitor-subject PCs in an ascending or descending order of the viewing rate of the specific site.

This enables easily knowing the viewing rate of each of the monitor-subject PCs at a specific site (category).

The fourth utilization method is displaying of a "list of application (category) specific PCs (employees)". The monitor-subject PCs are used as a duty spot computer and an overall computer, using a day, week, month, or year as a unit of the summation duration to display a list of the PCs in an order of the viewing rate of a specific application (category).

Specifically, the monitor-subject PCs hold logs of an application, while the monitor PC sets beforehand the application belonging to a specific application or category, to acquire the logs of the application used at each of the monitor-subject PCs from them and classify them and then store them in the memory portion.

In the manager software 21 of the monitor PC, the controlling means 22 and the data operating means 25 calculate the number of using times and the using times for a set application and, based on thus calculated values of the number of using times and the using times, calculate the use rate of a specific application using as the denominator the number of using times and the using time for all of the set applications. Then, the controlling means 22 and the displaying means 26 display a list of the names of the monitor-subject PCs in an ascending or descending order of the use rate.

This enables easily knowing the use rate of each of the monitor-subject PCs for a specific application (category).

The fifth utilization method is displaying of a "working-rate order list of PCs (employees)". The monitor-subject PCs are used as a duty spot computer and an overall computer and uses a day, week, month, or year as a unit of the summation duration and make setting of business or recreation in an application and a home page beforehand for classification into four items of "business", "recreation", "idle", and "unclear" on the basis of the application using time and the site visiting time. A ratio among those classified items is used to display a list of the PCs.

Specifically, the monitor PC makes the above-mentioned item classification at the application, site, etc. beforehand to thereby acquire from each of the monitor-subject PCs the logs of the application used at them and the viewed sites and classify these logs and then store them in the memory portion.

In the manager software 21 of the monitor PC, the controlling means 22 and the data operating means 25 calculate the using time and the viewing time for each item and also calculates the working rate=(total time of "business" classification)/(total time of all classifications) for each of the monitor-subject PCs. Then, the controlling means 22 and the displaying means 26 display a list of the names of the monitor-subject PCs in an ascending or descending order of the working rate. It is also possible to obtain "recreation rate", "idle rate", and "unclear rate".

This enables easily knowing the order of the working rates (rates of specific items).

The sixth utilization method is displaying of a "list of application-specific input characters." The monitor-subject PCs are used as an individual's computer, using a day as a unit of the summation duration to display input characters for each application.

Specifically, the monitor PC acquires and classifies the input character logs of the monitor-subject PCs according to the above-mentioned method and holds the input characters corresponding to the application in the memory portion. Then, the controlling means 22 and the displaying means 25 select and read in the input characters for each application to thereby display a list of the input characters for each application.

In contrast to the prior art method of displaying the characters for all the applications, this method enables easily knowing the contents of the characters for each of the applications.

The seventh utilization method is displaying of a "application category use rate". The monitor-subject PCs are used as an individual's computer, a duty post computer, and an overall computer and use a day, week, month, or year as a unit of the summation duration, and registers a category in a application beforehand to thereby sum up its use rates and display it for each category. In contrast to the prior art method of summing up the use rates for a specific word processor application, this method sums up the use rates for a category of the word processor software.

Specifically, the monitor PC classifies and sets applications into categories beforehand, so that the controlling means 22 and the data operating means 25 accumulate the using times for each category based on the logs of the use states of the applications classified after being acquired from each of the monitor-subject PCs to thereby obtain the application category use rate=(accumulated using times for each category)/(accumulated using times for all categories), which is then displayed by the controlling means 22 and the displaying means 26.

This enables easily knowing the use rate of each category to which an application belongs with respect to that of all the categories.

The eighth utilization method is displaying of a "site category viewing rate". The monitor-subject PCs are used as an individual's computer, a duty spot computer, and an overall computer and uses a day, week, month, or year as a unit of the summation duration and registers a category for each URL to thereby a category-specific viewing rate.

In contrast to the prior art method of telling which page and how long is viewed, this method summarizes A retrieval sites and B retrieval sites into one retrieval site and display it.

Specifically, the monitor PC sets categories as set for URLs beforehand to thereby acquire and classify the logs of site viewing for each of the monitor-subject PCs, so that the controlling means 22 and the data operating means 25 accumulate the viewing times for each of the categories to obtain the site category viewing rate=(accumulated viewing time for each category)/(accumulated viewing time for all categories), which is then displayed by the controlling means 22 and the displaying means 26.

This enables easily knowing the viewing rate for each category to which the site belongs with respect to that for all the categories.

In the computer monitoring system according to the invention, monitor-subject computers hold a log of a use state of the application software, which log is acquired from them by the monitor computer, which then calculates the using time and the use rate for each application software product except an idle state time and the idle state time and the use rate and output the use rates, to thereby enable not only acquiring the log of the monitor-subject computer but also measuring the use rate for each application software product at that monitor-subject computer, thus contributing to promotion of the proper use of the application software at the monitor-subject computers.

In the above-mentioned computer monitoring system according to the invention, the monitor computer can monitor a plurality of monitor-subject computers to thereby acquire logs at these monitor-subject computers in duty spots for each of them and output the use rate of the application software for that duty spot, thus, contributing to improvement of the business operations for each of the duty spots.

In the above-mentioned computer monitoring system according to the invention, the monitor computer acquires logs of input characters monitor-subject computers to analyze whether any one of these monitor-computers has created a document illegally, in order to inhibit illegal document creation, thus contributing to promoting of proper use at the monitor-subject computers.

In the above-mentioned computer monitoring system according to the invention, the monitor computer acquires logs of the contents of mail transmission/reception at monitor-subject computers to thereby analyze whether any one of these monitor-subject computers has transmitted or received a mail illegally, in order to inhibit illegal mail transmission/reception, thus contributing to promotion of proper use at the monitor-subject computers.

In the above-mentioned computer monitoring system according to the invention, the monitor computer acquires logs of browsing over the Internet by monitor-subject computers to thereby analyze whether any one of these monitor-subject computers has browsed illegally, in order to inhibit illegal browsing, thus contributing to promotion of proper use at the monitor-subject computers.

In the above-mentioned computer monitoring system according to the invention, the monitor computer acquires logs of installation/un-installation of software at monitor-subject computers to thereby analyze whether the software has been installed or un-installed at any one of these monitor-subject computers, in order to inhibit illegal installation/un-installation of the software, thus contributing to promotion of proper use at the monitor-subject computers.

In the above-mentioned computer monitoring system according to the invention, the monitor computer acquires logs of input characters at monitor-subject computers and also calculates the number of the input characters to thereby calculate the input efficiency for the software using time at the monitor-subject computers, in order to evaluate the input efficiency of the user of the monitor-subject computers, thus contributing to better personnel administration.

In the computer monitoring system according to the invention, monitor-subject computers hold logs of home page accesses, which logs are acquired from them by the monitor computer, which sums up the access times for each home page for a specific summation duration, in order to display a list of the URLs or names of the home pages in a descending order of the access times, thus enabling easily knowing popular sites.

In the computer monitoring system according to the invention, monitor-subject computers hold logs of use states of application software, which logs are acquired from them by the monitor computer, which calculates a working rate based on a ratio between an idle state time and the application soft using time, in order to display a list of the names of the monitor-subject computers in the order of the working rate, thus enabling easily knowing the monitor-subject computers having a high or low working rate.

In the computer monitoring system according to the invention, monitor-subject computers hold logs of site viewing, which logs are acquired from them by the monitor computer, so that if any one of the logs relates to a site registered beforehand, the monitor computer sums up the numbers of viewing times or the viewing times for each site to calculate a viewing rate based on thus calculated value of the number of the time, in order to display a list of the URLs or names of the sites in the order of the viewing rate, thus enabling easily knowing the viewing rate of the monitor-subject computers at a specific site.

In the computer monitoring system according to the invention, monitor-subject computers hold logs of the use state of application software, which log is acquired from them by the monitor computer, so that if any of the logs relates to application software products registered beforehand, the monitor computer sums up the numbers of using times or the using times for each of the application software products to thereby calculate the use rate based on thus calculated value of the times or the time, in order to display a list of the names of the monitor-subject computers in the order of the use rate, thus enabling easily knowing the use rate of the monitor-subject computers in a specific application software product.

In the computer monitoring system according to the invention, monitor-subject computers hold logs of the use state or the home page access for application software, while the monitor computer classifies beforehand the application software products or homes pages accessed into specific items, so that the monitor computer, when having acquired the logs from the monitor-subject computers, calculates the using time and the viewing time for each classification, in order to display a list of the names of the monitor-subject computers based on a ratio among the specific items, thus enabling easily knowing the monitor-subject computers having in the order of the ratio among the specific items.

In the computer monitoring system according to the invention, monitor-subject computers hold logs of characters input when application software is being used, which logs are acquired from them by the monitor computer, which in turn displays the input characters for each of the application software products, thus enabling easily knowing the input characters for each of the application software products.

In the computer monitoring system according to the invention, monitor-subject computers hold logs of the use state of application software, while the monitor computer classifies the application software products into categories and registers them beforehand, so that when having acquired the logs from the monitor-subject computers, the monitor computer sums up the using times both for each category and all of the categories to thereby calculate the use rate of a specific one with respect to that of all the categories, in order to display that use rate, thus enabling easily knowing the use rate of each category to which the relevant application relates with respect to that of the all categories.

In the computer monitoring system according to the invention, monitor-subject computers hold logs of the viewing state for sites, while the monitor computer classifies the sites into categories and registers them beforehand, so that when having acquired the logs from the monitor-subject computers, the monitor computer sums up the viewing times both for each category and for all the categories to thereby calculate the viewing rate of a specific category with respect to that of the all categories, in order to display that viewing rate, thus enabling easily knowing the viewing rate of each category to which the relevant site belongs with respect to that of all the categories.

What is claimed is:

1. A computer monitoring system comprising a monitor computer for monitoring a computer and a plurality of monitor-subject computers to be monitored by said monitor computer, wherein:

each one of said plurality of monitor-subject computers records logs of a use state of application software products, receives a log acquiring instruction from the monitor computer, reads out the recorded logs when said each one of the plurality of monitor-subject computers detects the log acquiring instruction, outputs and transmits them collectively to the monitor computer, and deletes the recorded logs from said each one of the plurality of monitor-subject computers; and said monitor computer outputs the log acquiring instruction to a specific monitor-subject computer when a log acquiring directive is input from a user of the monitor computer or automatically at a constant time, acquires said logs from said specific monitor-subject computer to which the log acquiring instruction is output in response to the log acquiring instruction, displays on a log displaying screen a log contents including input characters at said specific monitor-subject computer, further, when a directive for calculation and displaying of a use efficiency is input, calculates a using time which is a subtraction of idle state time that is a time period from a time point when a certain time has passed from an action of the application software products up to a next action, from a time when the application software products are activated up to the completion of the application software products, calculates the using time for each application software product, calculates a total idle state time in all the application software products, calculates a use rate for each of said application software products which is a rate of the using time of each application software product in total using time and the total idle state time of all application software products, a use rate of said idle state which is a rate of the total idle state time in total using time and the total idle state time of all application software products, and displays the use efficiency including the using time and the use rate for each of the application software products, and the total idle state time and the rate of the idle state.

2. The computer monitoring system according to claim 1, wherein a monitor computer can monitor the plurality of monitor-subject computers to thereby acquire a log at said monitor-subject computers in duty spot for each of said duty spots, thus outputting a use efficiency of said application software product for each said duty spot.

3. The computer monitoring system according to claim 2, wherein a monitor computer acquires a log of contents recorded by text of mail transmission/reception at the specific monitor-subject computer to thereby analyze whether said specific monitor-subject computer has performed illegal mail transmission/reception.

4. The computer monitoring system according to claim 2, wherein a monitor computer acquires a log of browsing over the Internet at the specific monitor-subject computer to thereby analyze whether said specific monitor-subject computer has performed illegal browsing.

5. The computer monitoring system according to claim 2, wherein a monitor computer acquires a log of software installation/un-installation at the specific monitor-subject computer to thereby analyze whether said specific monitor-subject computer has performed illegal software installation/un-installation.

6. The computer monitoring system according to claim 2, wherein a monitor computer acquires a log of characters input at the specific monitor-subject computer and also calculates the number of said input characters to thereby calculate an input efficiency with respect to an application software product using time at said specific monitor-subject computer.

7. The computer monitoring system according to claim 1, wherein the monitor computer analyzes whether the specific monitor-subject computer has performed illegal document creation from the log contents including input characters.

8. The computer monitoring system according to claim 1, wherein a monitor computer acquires a log of contents recorded by text of mail transmission/reception at the specific monitor-subject computer to thereby analyze whether said specific monitor-subject computer has performed illegal mail transmission/reception.

9. The computer monitoring system according to claim 1, wherein a monitor computer acquires a log of browsing over the Internet at the specific monitor-subject computer to thereby analyze whether said specific monitor-subject computer has performed illegal browsing.

10. The computer monitoring system according to claim 1, wherein a monitor computer acquires a log of software installation/un-installation at the specific monitor-subject computer to thereby analyze whether said specific monitor-subject computer has performed illegal software installation/un-installation.

11. The computer monitoring system according to claim 1, wherein a monitor computer acquires a log of characters input at the specific monitor-subject computer and also calculates the number of said input characters to thereby calculate an input efficiency with respect to an application software product using time at said specific monitor-subject computer.

12. A computer monitoring system comprising a monitor computer for monitoring a computer and a plurality of monitor-subject computers to be monitored by said monitor computer, wherein:
  each one of said plurality of monitor-subject computers records logs of a use state of application software, receives a log acquiring instruction from the monitor computer, reads out the recorded logs when said each one of the plurality of monitor-subject computer detects the log acquiring instruction, outputs and transmits them collectively to the monitor computer, and deletes the recorded logs from said each one of the plurality of monitor-subject computer; and
  said monitor computer outputs the log acquiring instruction to a specific monitor-subject computer when a log acquiring directive is input from a user of the monitor computer or automatically at a constant time, acquires said logs from said specific monitor-subject computer to which the log acquiring instruction is output in response to the log acquiring instruction, displays on a log displaying screen a log contents including input characters at the specific monitor-subject computer, further, by a displaying instruction for displaying a list of a working rate, calculates a using time which is a subtraction of idle state time that is a time period from a time point when a certain time has passed from an action of the application software up to a next action, from a time when that the application software product is activated up to the completion of the application software, sums the using time for each one of said plurality of monitor-subject computers, sums idle state time in all monitor-subject computers, calculates the working rate based on a ratio between the summed idle state time and the summed using time for each monitor-subject computer, and displays a list of the names of said plurality of monitor-subject computers in an order of said working rate.

13. The computer monitoring system according to claim 12, wherein:
  said monitor computer acquires said log for a use state of application software from said plurality of monitor-subject computers, so that if said log relates to application software products registered beforehand, said monitor computer sums up the numbers of using times or the using times for each of said application software products to thereby calculate a use rate based on a sum of said numbers or times, thus displaying a list of the names of said plurality of monitor-subject computers in an order of the use rate.

14. The computer monitoring system according to claim 12, wherein:
  each one of said plurality of monitor-subject computers holds a log of an application software use state or a home page access; and
  said monitor computer classifies beforehand application software products to be used or home pages to be accessed into specific items of use state, so that when having acquired said log from each one of said monitor-subject computers, said monitor computer classifies the log by the specific items, calculates a using time and a viewing time for each of said classifications, thus displaying a list of the names of said plurality of monitor-subject computers based on a ratio between a total time of specific items and a total time of all classification.

15. The computer monitoring system according to claim 14, wherein:
  each one of said plurality of monitor-subject computers acquires a log of a viewing state of sites; and
  said monitor computer classifies and registers sites in categories beforehand, so that when having acquired said log from said specific monitor-subject computer, said monitor computer classifies the log by the categories, sums up viewing times both for each of said categories and for all of said categories to thereby calculate a viewing rate of a specific category of all of said categories, thus displaying said viewing rate.

16. The computer monitoring system according to claim 12, wherein:
  said monitor computer classifies and registers application software products in categories beforehand, so that when having acquired said log of use state from said specific monitor-subject computer, said monitor computer classifies the log by the categories, sums up using times both for each of said categories and for all of said categories to thereby calculate a use rate of a specific category of all of said categories, thus displaying said use rate.

* * * * *